United States Patent
Ki et al.

(10) Patent No.: US 8,094,617 B2
(45) Date of Patent: Jan. 10, 2012

(54) METHOD FOR RECOGNIZING AVAILABLE CHANNEL IN IEEE 802.15.4 PROTOCOL CSMA/CA MECHANISM

(75) Inventors: Hyung Joo Ki, Suwon-si (KR); Sueng Jae Bae, Suwon-si (KR); Min Young Chung, Seoul (KR); Tae Jin Lee, Suwon-si (KR)

(73) Assignee: Sungkyunkwan University Foundation for Corporate Collaboration, Kyonggi-do (KR)

( * ) Notice: Subject to any disclaimer, the term of this patent is extended or adjusted under 35 U.S.C. 154(b) by 553 days.

(21) Appl. No.: 12/270,076

(22) Filed: Nov. 13, 2008

(65) Prior Publication Data

US 2009/0129353 A1 May 21, 2009

(30) Foreign Application Priority Data

Nov. 16, 2007 (KR) .................. 10-2007-0117338
Jan. 8, 2008 (KR) .................. 10-2008-0002041

(51) Int. Cl.
*H04W 4/00* (2009.01)
(52) U.S. Cl. .................. 370/329; 370/445
(58) Field of Classification Search .................. 370/329, 370/445
See application file for complete search history.

(56) References Cited

FOREIGN PATENT DOCUMENTS

KR 10-2006-0083654 7/2006

OTHER PUBLICATIONS

IEEE 802.15.4 for Wireless Sensor Networks: A Technical Overview, dated Jul. 14, 2005.*
Tae-Jin Lee et al., "MAC Throughput Limit Analysis of Slotted CSMA/CA in IEEE 802.15.4 WPAN," IEEE Communications Letters, vol. 10, No. 7, Jul. 2006, pp. 561-563.
Tae Hyun Kim et al., "Priority-Based Delay Mitigation for Event-Monitoring IEEE 802.15.4 LR-WPANs," IEEE Communications Letters, vol. 10, No. 3, Mar. 2006, pp. 213-215.

* cited by examiner

*Primary Examiner* — Kevin C Harper
*Assistant Examiner* — Sai-Ming Chan
(74) *Attorney, Agent, or Firm* — RatnerPrestia

(57) ABSTRACT

Disclosed is a method of recognizing an available channel in order to prevent channel occupation requirements from colliding with each other when one wireless channel is shared by plural terminals in a CSMA/CA mechanism using an IEEE 802.15.4 protocol slot, the method including: a first step of initializing a counter, CW, as 2, the CW being used for CCA which an attempt to perform is made before frame transmission; a second step of determining if a required channel is occupied; a third step of decreasing the CW by 1 when the channel is idle in the second step; a fourth step of re-determining if the channel is occupied; and a fifth step of, based on a determination result in the fourth step, determining if the CW is 1 when the channel is occupied.

6 Claims, 12 Drawing Sheets

METHOD FOR RECOGNIZING AVAILABLE CHANNEL IN IEEE 802.15.4 PROTOCOL CSMA/CA MECHANISM

BACKGROUND OF THE INVENTION

1. Field of the Invention

The present invention relates to a method of recognizing an available channel in an IEEE 802.15.4 protocol CSMA/CA mechanism. More particularly, the present invention relates to a method of recognizing an available channel in an IEEE 802.15.4 protocol CSMA/CA mechanism, in which a Random Backoff Time extension algorithm is used so as to simply and yet effectively improve performance of slotted CSMA/CA.

2. Description of the Prior Art

IEEE 802.15.4 is a network designed for low-cost, ultra low power, short range wireless communication, and has been designed for supporting a low power/low cost application to which IEEE 802.15.3 for a high-rate network suitable for a multimedia application, and IEEE 802.15.1 for a Bluetooth requiring a voice-grade QoS cannot be employed.

An IEEE 802.15.4 network includes an FFD (Full Function Device) and an RFD (Reduced Function Device). The FFD has all MAC functions provided by IEEE 802.15.4, and thus can operate as a PAN coordinator for managing a PAN and a network device. The RFD, a device in which only some of MAC functions of the IEEE 802.15.4 are realized, cannot play a role of a PAN coordinator and is used as only a network device. The RFD is capable of communicating with only a PAN coordinator or a coordinator. The FFD and RFD are used to configure a star topology or a peer-to-peer topology, and in such a topology, one of a beacon-enabled mode and a non beacon-enabled mode is used to carry out communication between terminals.

In a conventional technology, there was provided a channel preemption communication method according to IEEE 802.15.4 (Laid-Open Publication No: 10-2006-0083654, Jul. 21, 2006), in which, during IEEE 802.15.4 based communication of a coordinator and plural network devices, a certain network device from among the plural network devices can continuously communicate with the coordinator without communication disconnection by preempting a certain channel. The conventional method includes the steps of: generating, by the coordinator, a beacon including a channel preemption field in which certain channel preemption by a certain network device is recorded; transmitting the beacon including the channel preemption field to the plural network devices by the coordinator; and continuously carrying out communication of the channel preempting network device from among the plural network devices which have received the beacon, the channel preempting network device being recorded in the channel preemption field of the beacon, with the coordinator by preempting the certain channel. For this, a conventional structure of a beacon frame is required to be modified, which results in reduction of network throughput, and power consumption of a terminal.

Also, in "MAC Throughput Limit Analysis of Slotted CSMA/CA in IEEE 802.15.4 WPAN", an Embedded Markov chain was used to analyze MAC throughput of slotted CSMA/CA (carrier sense multiple access with collision avoidance) in a saturated state, and the analysis was verified by simulation. Also, in "Priority-based delay mitigation for event-monitoring IEEE 802.15.4 LR-WPANs", based on the reason that CCA (Clear Channel Assessment) is successively performed twice in slotted CSMA/CA, FRT(Frame Tailoring) and PRT (Priority Toning) were suggested to improve performance of slotted CSMA/CA from the standpoint of packet delay. However, the conventional technology has a disadvantage in that the FRT is required to be implemented in hardware, and is impossible to implement in a current chipset.

Hereinafter, a conventional technology will be described.

FIG. 1 illustrates an IEEE 802.15.4 network topology. In a beacon-enabled mode of an IEEE 802.15.4 MAC protocol, a superframe managed by a PAN coordinator is defined. The superframe has a range determined by a beacon message periodically transmitted by the PAN coordinator, and is divided into an active period and an inactive period. The active period is divided into 16 equally spaced time slots, and a first time slot starts following the end of a beacon frame. The active period is divided into a CAP (Contention Access Period) and a CFP (Contention Free Period), and the CFP includes GTSs (Guaranteed Time Slots). In the beacon-enabled mode, during the CAP of the superframe, respective terminals compete with each other to access a channel by using a slotted CSMA/CA algorithm. The CFP includes GTSs (Guaranteed Time Slots), and each GTS is allocated to a certain network terminal so as to transmit data sensitive to time delay.

FIG. 2 illustrates a structure of a superframe in an IEEE 802.15.4 beacon-enabled mode. Each terminal tries to access a channel by using three counters (NB, BE and CW) in a CAP. NB indicates the number of times a terminal has tried to access a channel in order to transmit one frame; BE (backoff exponent) is for determining a random backoff time; and CW (connection window) is a counter for CCA, which is performed before frame transmission.

In the case of slotted CSMA/CA, a terminal having data to be transmitted initializes values of NB and CW as 0 and 2, respectively. Before trying to access a channel, a terminal waits for a unit backoff time corresponding to a randomly selected integer within a range of $0 \sim 2^{BE}-1$, and then performs CCA in order to determine whether the channel is busy or idle.

If the channel is busy, the terminal initializes CW, increases NB and BE by 1, respectively, and determines whether NB is greater than macMaxCSMABackoffs or not. macMaxCSMABackoffs is set as 4. If NB is greater than macMaxCSMABackoffs, the terminal fails to access the channel.

If the channel is idle, the terminal decreases CW by 1, and secondly performs CCA. After secondly performing the CCA, if the channel is idle, the terminal decreases CW by 1 again. Herein, if CW is 0, the terminal succeeds in channel access. When the terminal fails in channel access, or collision occurs by CCA performances of competing terminals in a common slot, three re-transmission opportunities are given.

FIG. 3 illustrates a flow chart showing operation in conventional slotted CSMA/CA according to IEEE 802.15.4. FIG. 4 illustrates an example of channel access in conventional slotted CSMA/CA according to IEEE 802.15.4.

A terminal having data to be transmitted initializes NB and CW as 0 and 2, respectively, in step s301. The terminal checks battery life extension in step s302, and then, in step s303, initializes BE as macMinBE when battery life extension is not used, or in step s304, sets BE as the lesser of 2 and macMinBE when battery life extension is used. After locating a backoff period boundary in step s305, the terminal waits for a unit backoff period corresponding to a randomly selected integer within a range of $0 \sim 2^{BE}-1$ in step s306 before an attempt to access a channel is made, and then performs CCA in step s307 in order to determine whether the channel is busy or idle. The terminal, in step s308, determines whether the channel is busy or idle through the CCA, and then, in step s309, decreases CW by 1 when the channel is idle, and determines whether the CCA is second CCA or not in step s310.

If the CCA is not second CCA, the procedure returns back to s307. After secondly performing CCA, the terminal decreases CW by 1 again when the channel is idle, and then succeeds in channel access when CW is 0 through steps s307, s308, s309, s310, and s311. If the channel is busy, the terminal sets CW as 2, increases NB by 1, and sets BE as min(BE+1, amaxBE) in step s312, and then determines whether NB is greater than macMaxCSMABackoffs or not in step s313. When NB is greater in step s313, channel access is unsuccessful in step s314, or when NB is not greater, the terminal proceeds to step s306.

In slotted CSMA/CA, a terminal having a frame to be transmitted performs CCA before trying to transmit the frame, and transmits the frame when two successive CCA performances are successful. The reason CCA is performed twice is to prevent a data frame to be transmitted by a terminal from colliding with an ACK frame, the ACK frame being received by another terminal when data frame transmission is successful. Success in the first CCA and failure in the second CCA mean that in a slot prior to performance of the second CCA, a channel is idle, and in a slot where the second CCA is performed, a channel is busy. This indicates that in the slot where the second CCA is performed, another terminal has started transmission.

FIG. 5 illustrates occurrence of collision between frames and failure of a terminal in second CCA. According to a conventional slotted CSMA/CA mechanism, when terminals perform first CCA in a common slot, collision between frames transmitted by the terminals occurs. Also, in the case of success in first CCA and failure in second CCA, there is a problem in that energy consumption is caused by performance of the second CCA even though channel access is unsuccessful.

FIG. 6 illustrates throughput of slotted CSMA/CA with an increase of the number of terminals sharing media in a saturated state with a 2.4 GHz bandwidth.

SUMMARY OF THE INVENTION

Accordingly, the present invention has been made to solve the problems of slotted CSMA/CA used in an IEEE 802.15.4 beacon-enabled mode, and the present invention provides a method of recognizing an available channel in an IEEE 802.15.4 protocol CSMA/CA mechanism, in which a parameter, aBESCB, used upon failure in second CCA is newly introduced, and is set to BE for performing backoff when second CCA is unsuccessful.

In the present invention, a method of extending a backoff time of a terminal to aMaxBE is used upon success in first CCA, and failure in second CCA, which is for reducing the possibility of collision occurrence between terminals and the number of times of CCA performed in transmitting one frame, so as to improve throughput and to reduce energy consumption of a terminal.

In accordance with an aspect of the present invention, there is provided a method of recognizing an available channel in order to prevent channel occupation requirements from colliding with each other when one wireless channel is shared by plural terminals in a CSMA/CA mechanism using an IEEE 802.15.4 protocol slot, in which a backoff time varies by allocating different backoff exponents (BEs) for determining a random backoff time to a case where first CCA is unsuccessful and another case where second CCA is unsuccessful, the method including: a first step of initializing a counter, CW, as 2, the CW being used for CCA which an attempt to perform is made before frame transmission; a second step of determining if a required channel is occupied; a third step of decreasing the CW by 1 when the channel is idle in the second step; a fourth step of re-determining if the channel is occupied; and a fifth step of, based on a determination result in the fourth step, determining if the CW is 1 when the channel is occupied.

It is preferable to further include a sixth step of setting BE as aMaxBE when the fifth step is "TRUE", and to initialize the CW and increase BE by 1 when the fifth step is "FALSE".

In accordance with another aspect of the present invention, there is provided a method of recognizing an available channel in order to prevent channel occupation requirements from colliding with each other when one wireless channel is shared by plural terminals in a CSMA/CA mechanism using an IEEE 802.15.4 protocol slot, in which a backoff time varies by allocating different backoff exponents (BEs) for determining a random backoff time to a case where first CCA is unsuccessful and another case where second CCA is unsuccessful, the method including: a first step of initializing counters, CW, and NB, as 2 and 0, respectively, the CW being used for CCA which an attempt to perform is made before frame transmission, and the NB being a number of times a terminal tries to access a channel in order to transmit one frame; a second step of waiting for a unit backoff period corresponding to a randomly selected integer within a range of $0\sim2^{BE}-1$; a third step of determining if a required channel is occupied; a fourth step of decreasing the CW by 1 when the channel is idle in the third step; a fifth step of re-determining if the channel is occupied; and a sixth step of, based on a determination result in the fifth step, determining if the CW is 1 when the channel is occupied.

It is preferable to set BE as aBESCB, a certain value greater than aMaxBE, when the sixth step is "TRUE", and to initialize the CW and increase BE by 1 when the sixth step is "FALSE".

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Reference will now be made in detail to the preferred embodiments of the present invention. However, the following examples are illustrative only, and the scope of the present invention is not limited thereto.

In Slotted CSMA/CA, a terminal having a frame to be transmitted performs CCA before making an attempt to transmit the frame, and then transmits the frame when CCA is successively successfully performed twice. The reason that CCA is successively performed twice is to prevent a data frame to be transmitted by the terminal from colliding with an ACK frame, the ACK frame being received by another terminal when another data frame is successfully transmitted. Success in the first CCA and failure in the second CCA mean that in a slot prior to performance of the second CCA, a channel is idle, and in a slot where the second CCA is performed, a channel is busy. This indicates that in the slot where the second CCA is performed, another terminal has started frame transmission. By using such a property of the slotted CSMA/CA, the present invention provides a Random Backoff Time extension algorithm for extending a backoff time upon failure in second CCA.

The Random Backoff Time extension algorithm according to the present invention uses NB, BE, and CW in the same manner of conventional slotted CSMA/CA, and herein, the counters are used for the same purpose as that of the conventional mechanism. Also, the present invention newly introduces aBESCB which is a parameter used when second CCA is unsuccessful. The aBESCB has a value greater than aMaxBE. In the conventional slotted CSMA/CA, upon failure in CCA, regardless of the order of CCA, a terminal increases BE by 1, and performs backoff. Meanwhile, in a Random Backoff Time extension algorithm, upon failure in second CCA, a terminal sets BE as aBESCB and performs backoff. Thus, it is possible to reduce a possibility that terminals perform first CCA in a common slot, thereby decreasing the probability of collision occurrence. In addition, a backoff period is extended, thereby decreasing the number of times of performed CCA. After failure in the second CCA, a terminal using the Random Backoff Time extension algorithm sets aMaxBE to BE used when the first CCA is unsuccessful. This results in extension of a backoff time.

Figure 1:
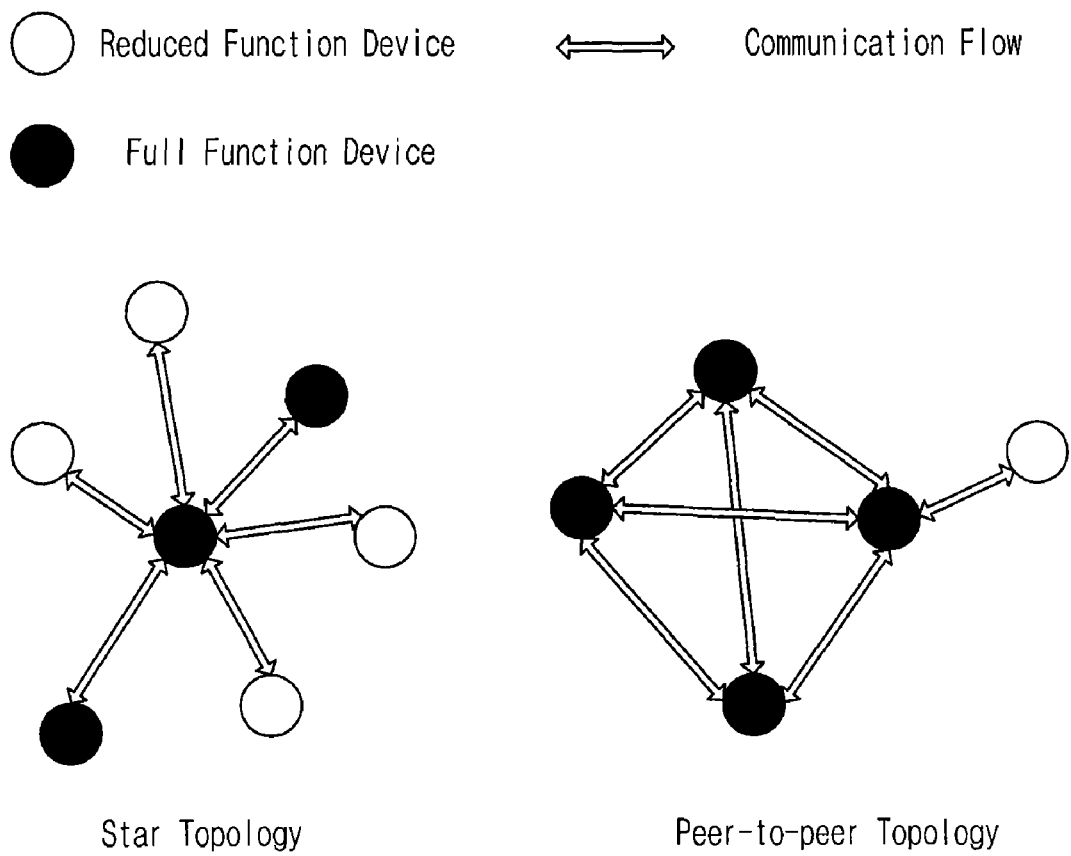
FIG. 1 illustrates a general IEEE 802.15.4 network topology.
Figure 2:
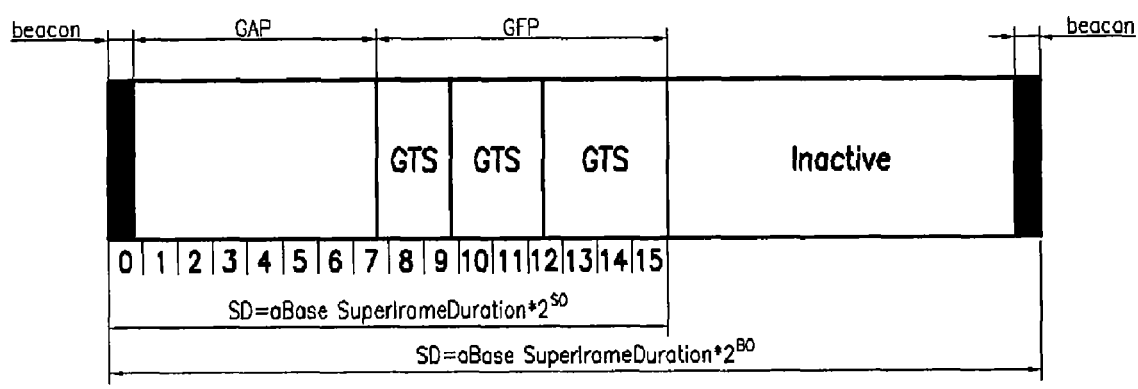
FIG. 2 illustrates a structure of a general IEEE 802.15.4 superframe.
Figure 3:
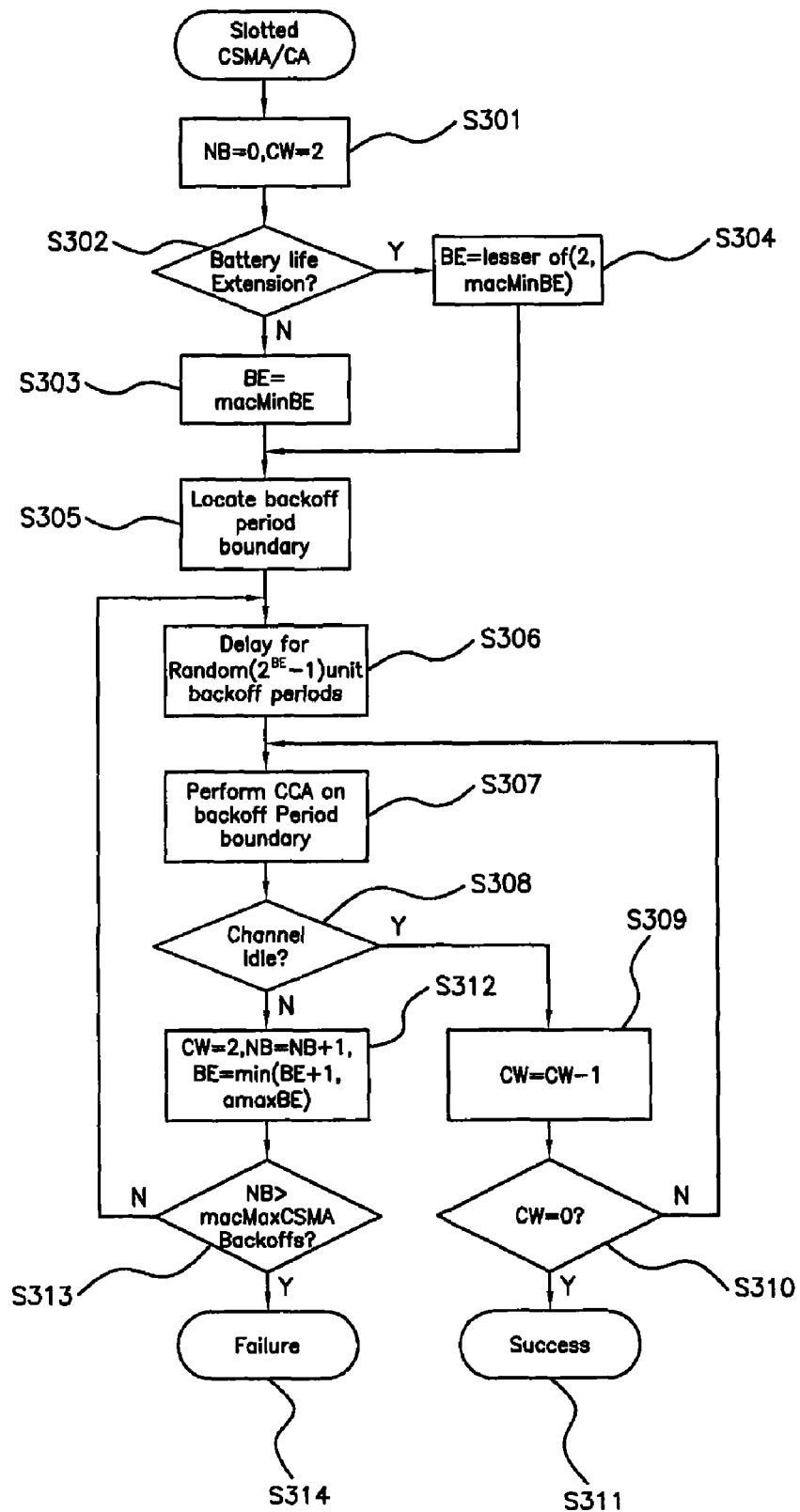
FIG. 3 illustrates a flow chart showing operation in conventional slotted CSMA/CA according to IEEE 802.15.4.
Figure 4:
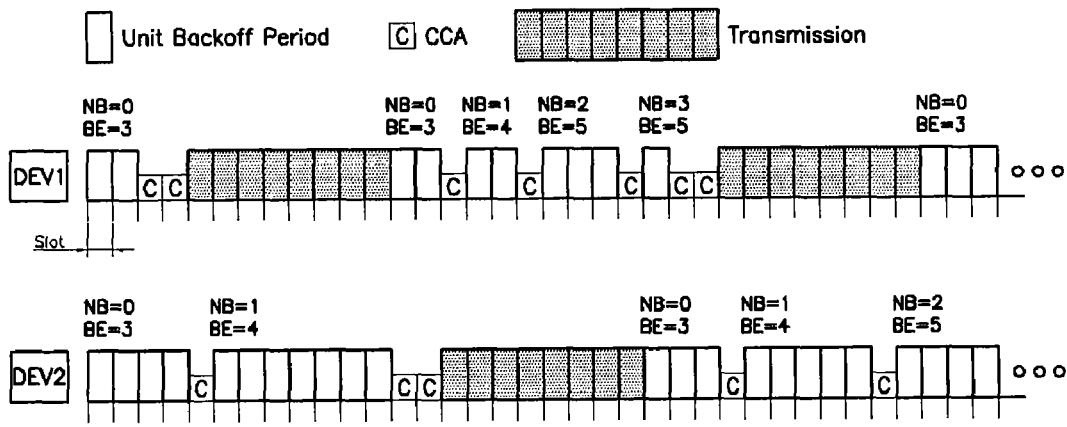
FIG. 4 illustrates an example of channel access in conventional slotted CSMA/CA according to IEEE 802.15.4.
Figure 5:
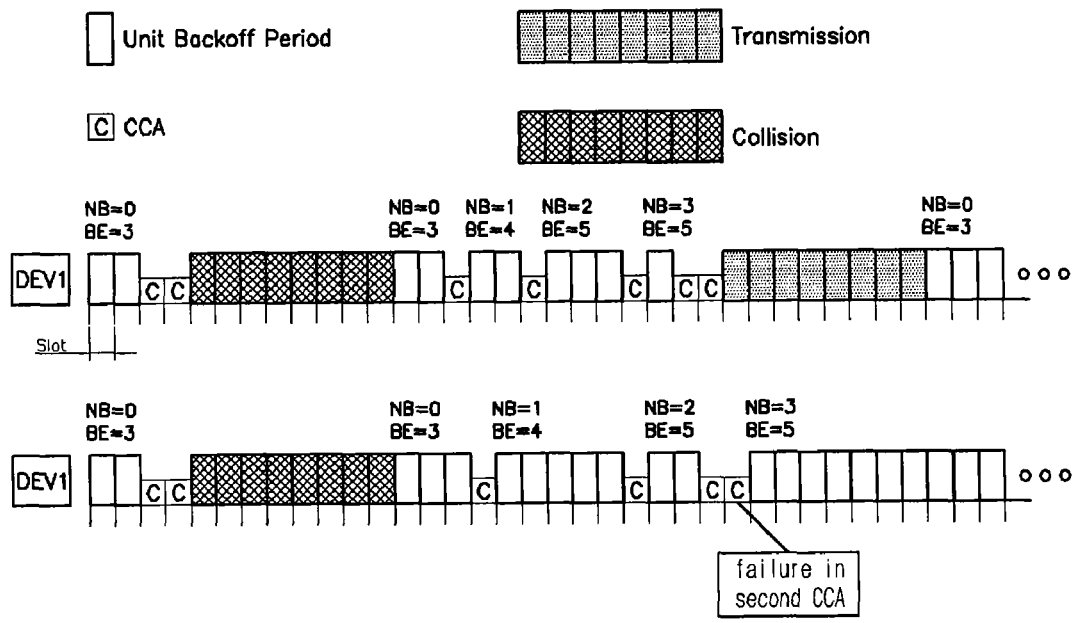
FIG. 5 illustrates occurrence of collision between frames and failure of a terminal in second CCA.
Figure 6:
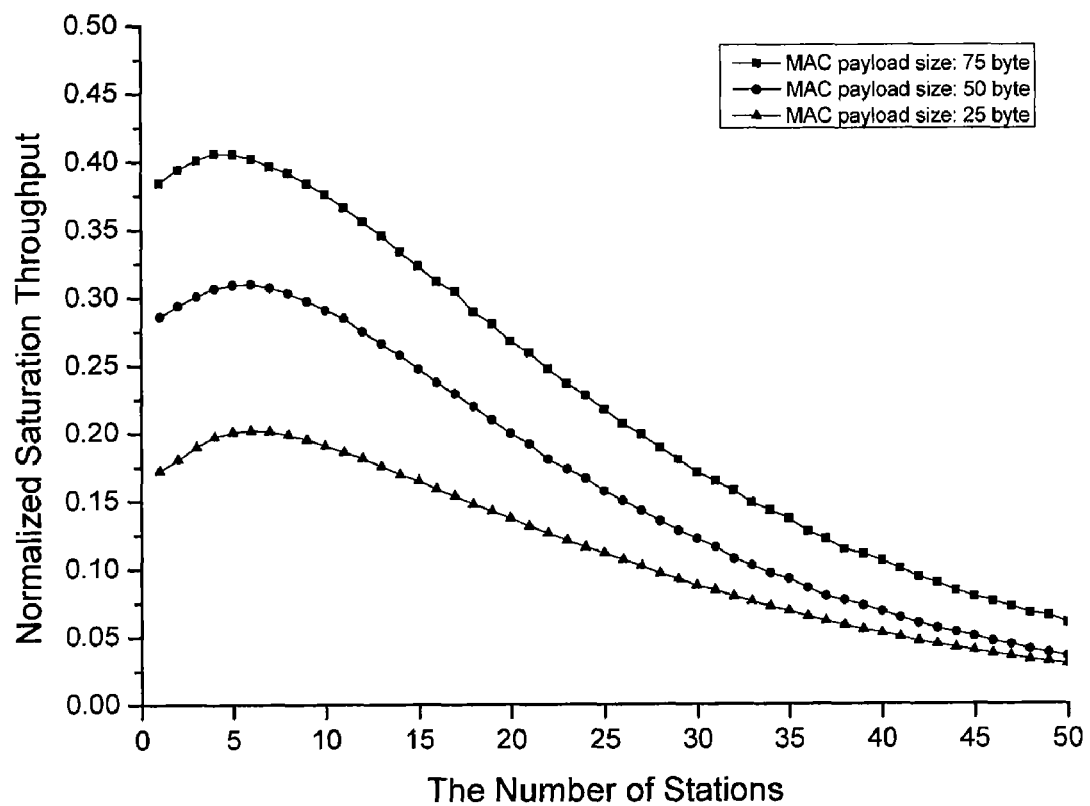
FIG. 6 illustrates throughput of slotted CSMA/CA with an increase of the number of terminals sharing media in a saturated state with a 2.4 GHz bandwidth.
Figure 7:
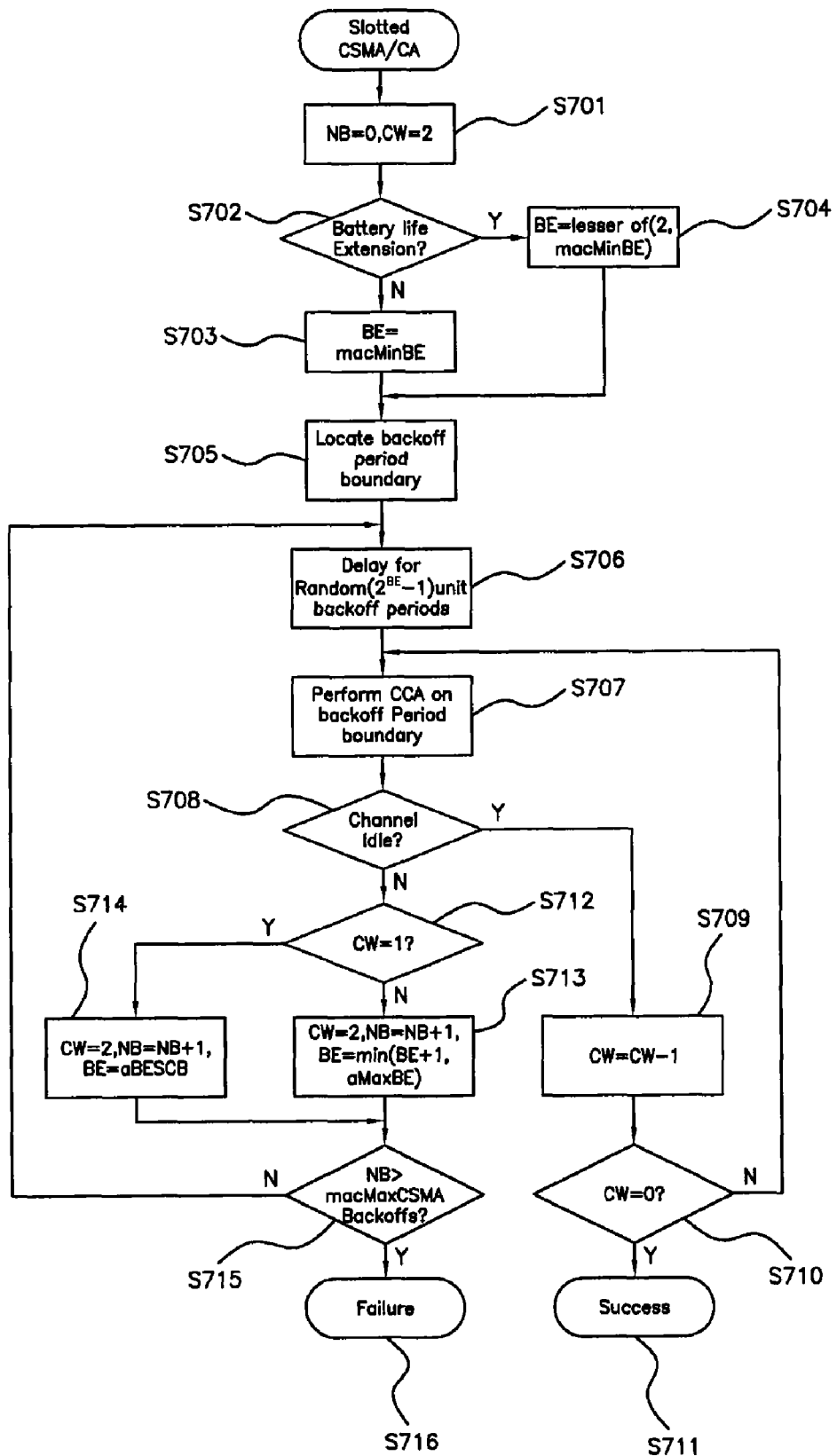
FIG. 7 illustrates a flow chart showing a random backoff extension time communication mechanism according to the present invention in IEEE 802.15.4.

FIG. 7 illustrates a flow chart showing a random backoff extension time communication mechanism according to the present invention in IEEE 802.15.4. In a Random Backoff Time extension algorithm, a terminal having data to be transmitted initializes NB and CW as 0 and 2, respectively in step s701. The terminal checks battery life extension in step s702, and then, in step s703, initializes BE as macMinBE when battery life extension is not used, or in step s704, sets BE as the lesser of 2 and macMinBE when battery life extension is used. After locating a backoff period boundary in step s705, the terminal waits for a unit backoff period corresponding to a randomly selected integer within a range of $0 \sim 2^{BE}-1$ in step s706 before an attempt to access a channel is made, and then performs CCA in step s707 in order to determine whether the channel is busy or idle. The terminal, in step s708, determines whether the channel is busy or idle through the CCA, and then, in step s709, decreases CW by 1 when the channel is idle, and determines whether the CCA is second CCA or not in step s710. If the CCA is not second CCA, the procedure returns back to step s707. After secondly performing CCA, the terminal decreases CW by 1 again when the channel is idle, and then succeeds in channel access when CW is 0 through steps s707, s708, s709, s710, and s711. If the channel is busy, the terminal, in step s712, checks the value of CW to determine whether previous CCA is first CCA or second CCA. When CW is not 1, the terminal initializes CW and increases NB and BE by 1, respectively, in step s713. CW being 1 indicates failure in second CCA. Accordingly, the terminal initializes CW, increases NB by 1, and sets BE as aBESCB in step s714. Then, the terminal determines whether NB is greater than macMaxCSMABackoffs or not in step s715. When NB is greater, the terminal fails in channel access in step s716, or when NB is not greater, the terminal proceeds to step s706. When the terminal fails in channel access, or collision occurs by CCA performances of competing terminals in a common slot, three re-transmission opportunities are given.

Figure 8:
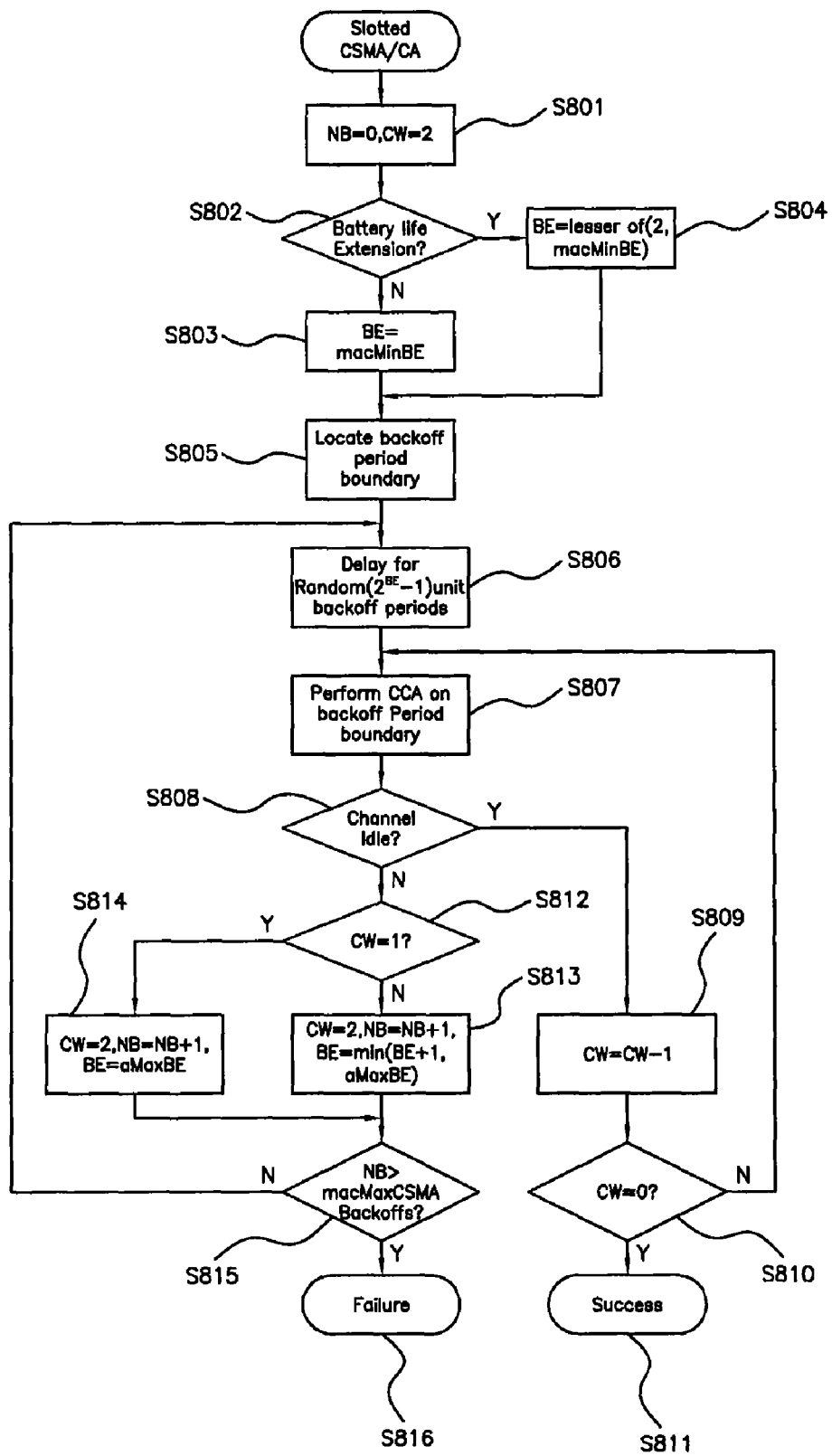
FIG. 8 illustrates a flow chart showing a random backoff extension time communication mechanism according to another embodiment of the present invention in IEEE 802.15.4.
Figure 9:
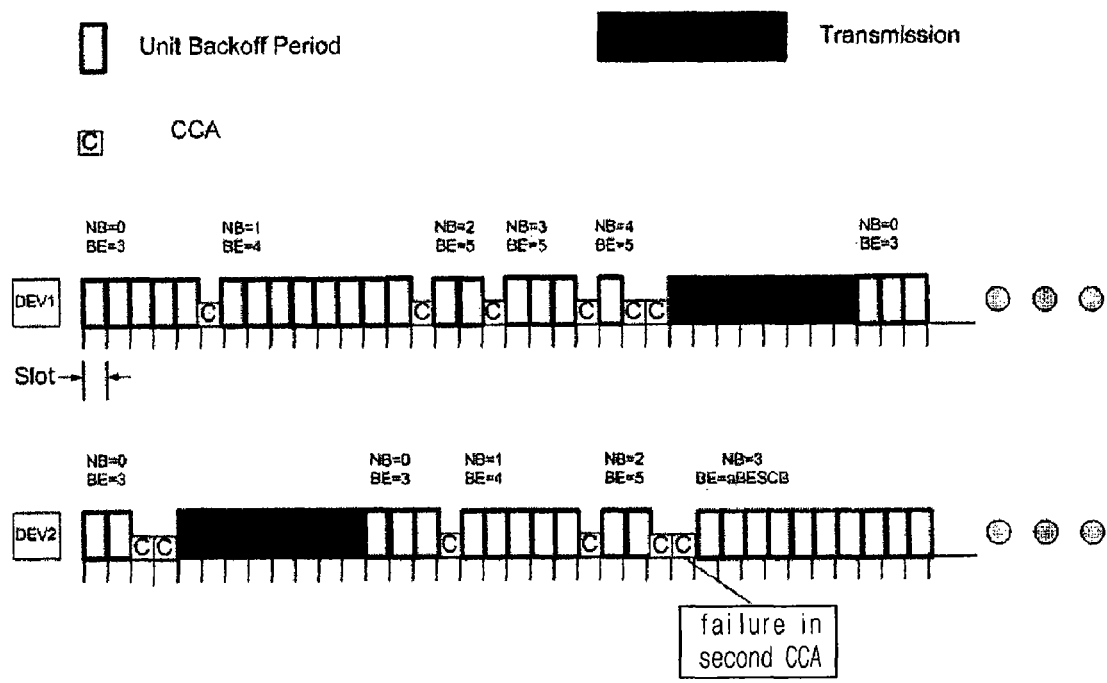
FIG. 9 illustrates an example of a channel access mechanism according to the present invention.

FIG. 8 illustrates a flow chart showing a random backoff extension time communication mechanism according to another embodiment of the present invention in IEEE 802.15.4; and FIG. 9 illustrates an example of a channel access mechanism according to the present invention. In a Random Backoff Time extension algorithm according to the present invention, a terminal having data to be transmitted initializes NB and CW as 0 and 2, respectively, in step S801. The terminal checks battery life extension in step s802, and then, in step s803, initializes BE as macMinBE when battery life extension is not used, or in step s804, sets BE as the lesser of 2 and macMinBE when battery life extension is used. After locating a backoff period boundary in step s805, the terminal waits for a unit backoff period corresponding to a randomly selected integer within a range of $0 \sim 2^{BE}-1$ in step s806 before an attempt to access a channel is made, and then performs CCA in step s807 in order to determine whether the channel is busy or idle. The terminal, in step s808, determines whether the channel is busy or idle through the CCA, and then, in step s809, decreases CW by 1 when the channel is idle, and determines whether the CCA is second CCA or not in step s810. If the CCA is not second CCA, the procedure returns back to step s807. After secondly performing CCA, the terminal decreases CW by 1 again when the channel is idle, and then succeeds in channel access when CW is through steps s807, s808, s809, s810, and s811. If the channel is busy, the terminal, in step s812, checks the value of CW to determine whether previous CCA is first CCA or second CCA. When CW is not 1, the terminal initializes CW and increases NB and BE by 1, respectively, in step s813. CW being 1 indicates success in the first CCA and failure in the second CCA. Accordingly, the terminal initializes CW, increases NB by 1, and sets BE as aMaxBE in step s814. Then, the terminal determines whether NB is greater than macMaxCSMABackoffs or not in step s815. When NB is greater, the terminal fails in channel access in step s816, or when NB is not greater, the terminal proceeds to step s806. When the terminal fails in channel access, or collision occurs by CCA performances of competing terminals in a common slot, three re-transmission opportunities are given. The steps in FIG. 8 are different from those in FIG. 7 in that there is no need to additionally use a parameter, aBESCB.

<Performance Test>

In order to test performance of a Random Backoff Time extension algorithm in a method of recognizing an available channel in an IEEE 802.15.4 protocol CSMA/CA mechanism according to the present invention, a star topology where N terminals compete with each other in order to communicate with one coordinator was assumed. Also, it was assumed that each terminal is always in a saturated state where there is a frame to be transmitted, even after success in frame transmission. A superframe was assumed to be formed as a CAP period, and BO (Beacon Order) was 14. A bandwidth used for simulation was 2.4 GHz, and data transmission rate of 250 Kbps and O-QPSK (4 bits/symbol) were used. The value of abescb for a Random Backoff Time extension algorithm was set as 6. Table 1 shows MAC parameters used for the simulation.

TABLE 1

| Parameter | | Value | |
|---|---|---|---|
| $T_{slot}$ | Slot time | 20 | symbols |
| $T_H$ | MAC header + PHY header transmission time | 15 | bytes |
| $T_P$ | MAC payload Transmission time | 25, 50, 75 | bytes |
| $T_{Prop}$ | Propagation delay | 1 | μsec |
| $T_{ack}$ | Time between Data frame and ACK frame | 12☐32 | symbols |
| $T_{Ack}$ | ACK frame transmission time | 11 | bytes |
| $T_{LIFS}$ | long IFS duration | 40 | symbols |

Figure 10:
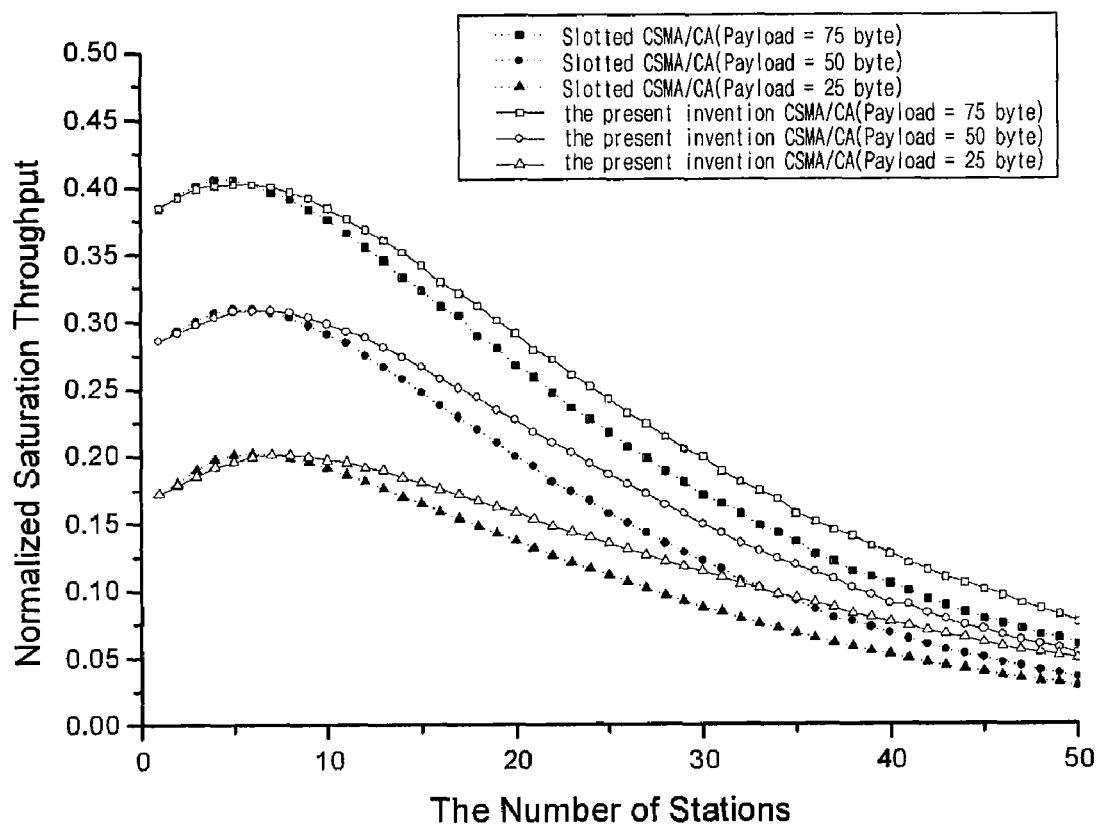
FIG. 10 illustrates normalized saturation throughputs in conventional slotted CSMA/CA, and in a Random Backoff Time extension communication mechanism according to the present invention.

FIG. 10 illustrates normalized saturation throughputs in conventional slotted CSMA/CA, and in a Random Backoff Time extension communication mechanism according to the present invention. In the conventional slotted CSMA/CA, in a saturated state, an increase of the number of competing terminals increases the possibility that second CCA is tried and collision of a transmitted frame occurs. Accordingly, with an increase of the number of competing terminals, a normalized throughput in a saturated state decreases. Meanwhile, in THE Random Backoff Time extension communication mechanism according to the present invention, when second CCA is unsuccessful, BE for performing backoff is set as aBESCB. From then on, the possibility that terminals perform first CCA in a common slot is decreased, thereby reducing the probability of collision occurrence. In the Random Backoff Time extension algorithm according to the present invention, there is a tendency that an increase of the number of competing terminals results in a decrease of normalized throughput in the same manner of conventional slotted CSMA/CA. However, a normalized throughput of the Random Backoff Time extension communication mechanism according to the present invention is higher than that of the conventional slotted CSMA/CA, which means that the use of a communication mechanism according to the present invention makes it possible to more efficiently use a channel. Therefore, it is understood that the Random Backoff Time extension communication mechanism according to the present invention has ability higher than the conventional slotted CSMA/CA in collision resolution.

Figure 11:
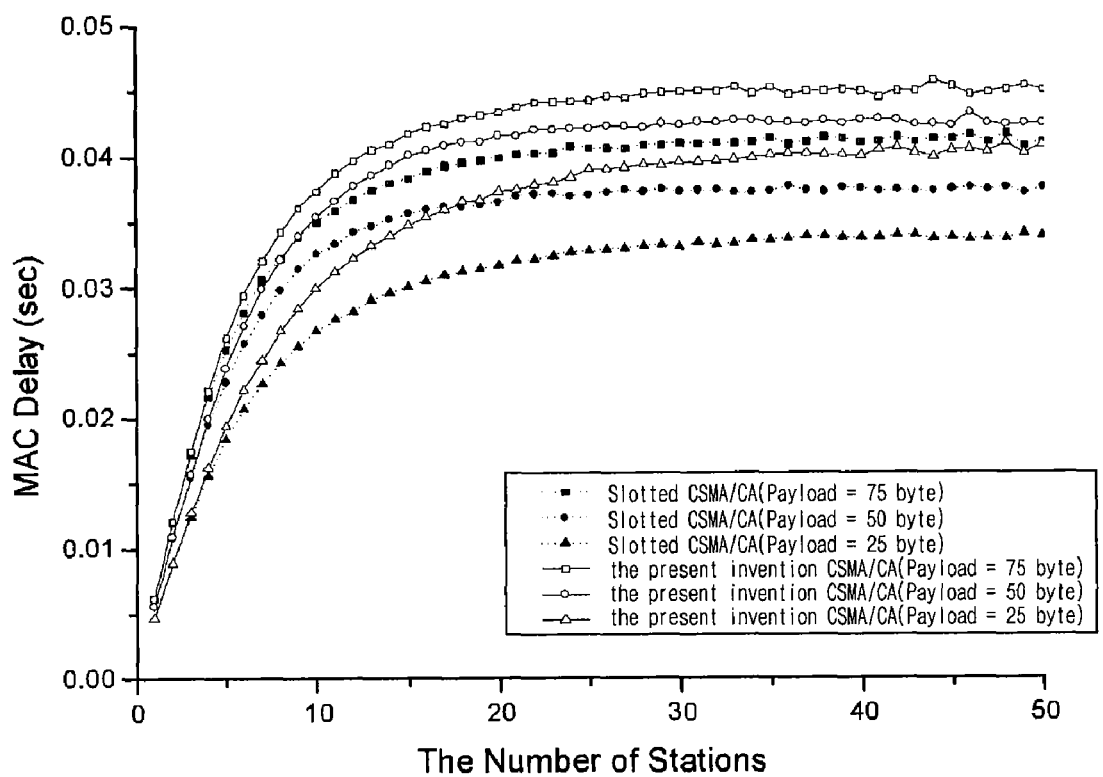
FIG. 11 illustrates average MAC delays of terminals using conventional slotted CSMA/CA and a Random Backoff Time extension communication mechanism according to the present invention.

FIG. 11 illustrates average MAC delays of terminals using conventional slotted CSMA/CA and a Random Backoff Time extension communication mechanism according to the present invention, in which a MAC delay indicates a time interval from an attempt to access a channel to success in frame transmission by a terminal having a frame to be transmitted. It can be seen from FIG. 11 that an average MAC delay of the terminal using the Random Backoff Time extension algorithm according to the present invention is longer than that of the terminal using the conventional slotted CSMA/CA. This is because in the Random Backoff Time extension algorithm, after failure in the second CCA, BE used when the first CCA is unsuccessful is set as aMaxBE, and thus a delay time caused by backoff is prolonged. Also, another reason is because the number of dropped frames is less than that of the conventional slotted CSMA/CA.

Figure 12:
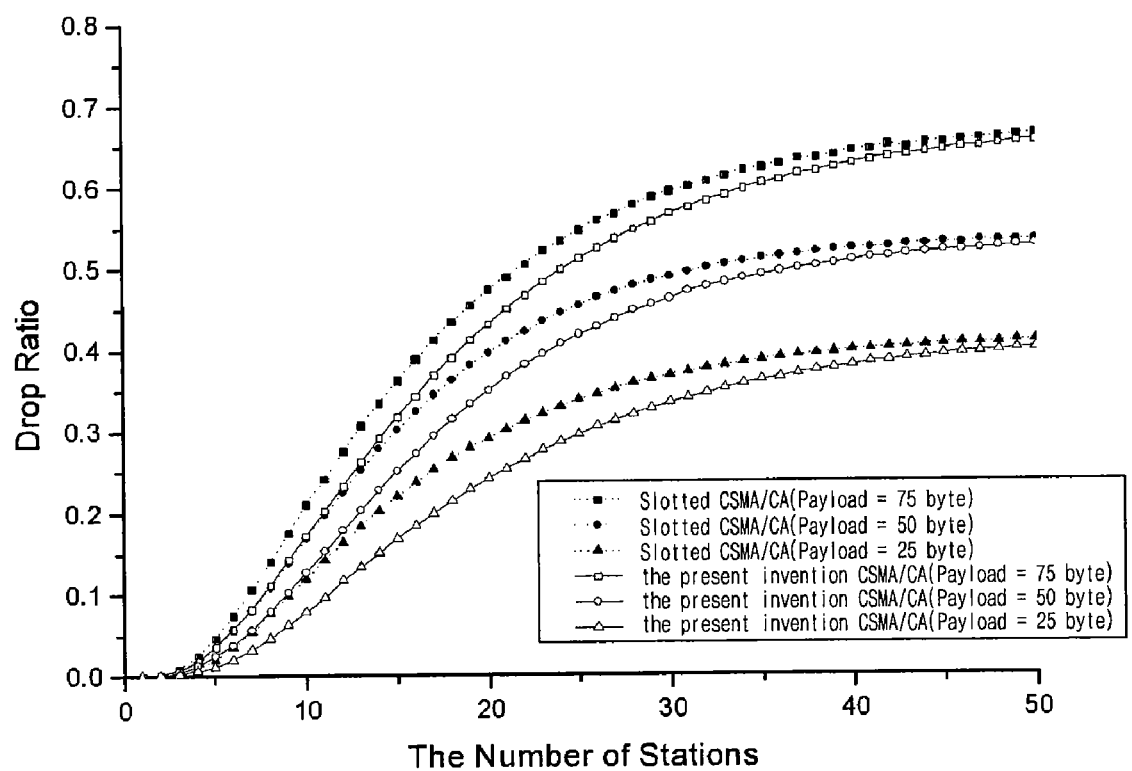
FIG. 12 illustrates the ratio of dropped frames with respect to frames which each terminal made an attempt to transmit.

FIG. 12 illustrates the ratio of dropped frames with respect to frames which each terminal made an attempt to transmit. A terminal using a Random Backoff Time extension algorithm according to the present invention, as compared to another terminal using a conventional slotted CSMA/CA algorithm, has greater possibility of success in frame transmission. This indicates that the number of dropped frames of a conventional algorithm using terminal is greater than that of a terminal using the Random Backoff Time extension algorithm. The reason that an average MAC delay of a terminal using a Random Backoff Time extension algorithm according to the present invention is longer than that of a conventional slotted CSMA/CA using terminal is because only a small number of frames was dropped during simulation time.

Figure 13:
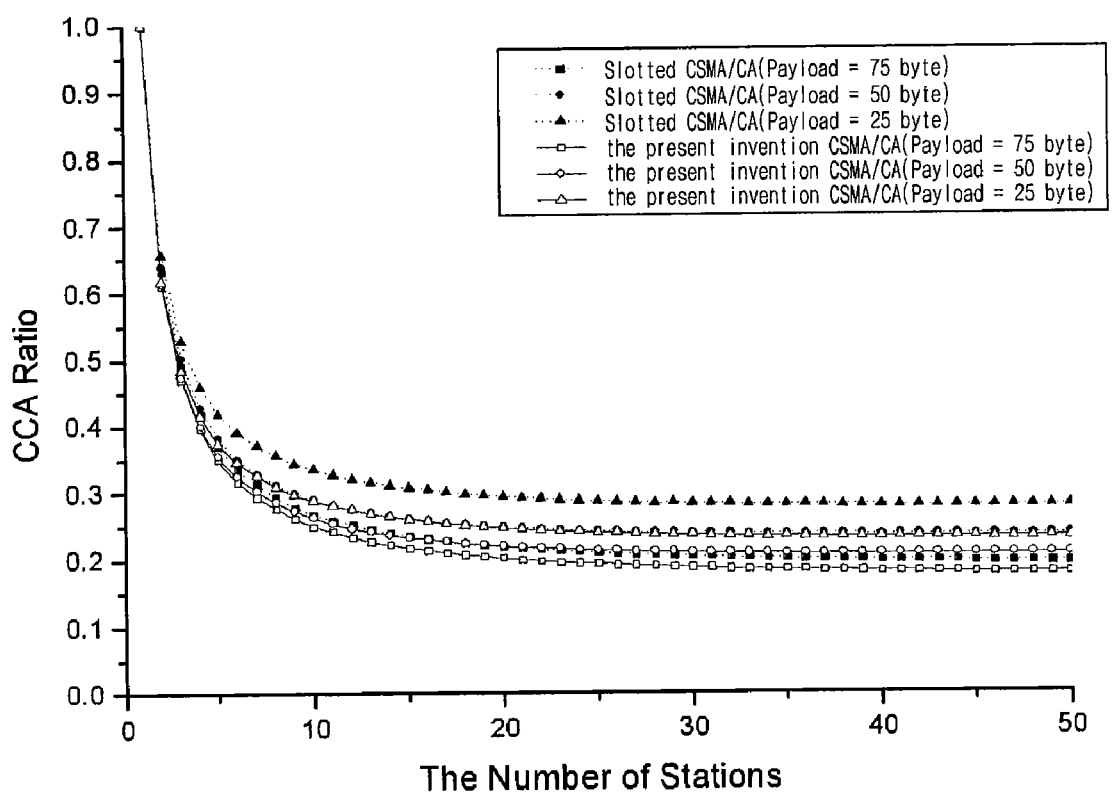
FIG. 13 illustrates the ratio of the number of times a terminal performs CCA when there exists any competing terminal, with respect to the number of times the terminal performs CCA when there exist no competing terminals.

FIG. 13 illustrates the ratio of the number of times a terminal performs CCA when there exists any competing terminal, with respect to the number of times the terminal performs CCA when there exist no competing terminals. Since failure in CCA prolongs an average time of following backoff, the number of times of CCA is decreased with an increase of the number of terminals (as compared to when only one terminal exists). Referring to FIG. 13, although there is a tendency that in both terminals using slotted CSMA/CA and a Random Backoff Time extension algorithm, the number of times of CCA is decreased with an increase of the number of competing terminals, it can be understood that the number of times of CCA in terminals using the Random Backoff Time extension algorithm is less than that of the others using the conventional slotted CSMA/CA. In transmitting a frame, a terminal consumes more energy per unit time in CCA performance than in an idle channel. Thus, a decrease of the number of times of CCA results in an increase of energy efficiency. Accordingly, it can be understood that the Random Backoff Time extension algorithm according to the present invention, as compared to conventional slotted CSMA/CA, is better in energy efficiency.

The present invention achieves following effects.

First, a conventional slotted CSMA/CA mechanism had a problem in that there is a high possibility that terminals perform first CCA in a common slot, thereby reducing throughput with an increase of the number of competing terminals. In the present invention, upon success in the first CCA, and failure in the second CCA, BE is set as aBESCB so as to extend the range of a backoff period. Therefore, the possibility that terminals perform first CCA in a common slot is reduced, thereby reducing the possibility of collision occurrence between the terminals.

Second, due to the setting of BE as aBESCB and extension of backoff period range, upon success in the first CCA and failure in the second CCA, it is possible to reduce the number of times of CCA performed in a terminal while another terminal transmits a frame. Therefore, from the standpoint of energy consumption, there is an advantage in that energy consumption for frame transmission in a terminal can be reduced.

Therefore, it is possible to solve the problems slotted CSMA/CA: throughput reduction with an increase of the number of competing terminals, and an increase of consumption energy.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of recognizing an available channel in order to prevent channel occupation requirements from colliding with each other when one wireless channel is shared by plural terminals in a CSMA/CA mechanism using an IEEE 802.15.4 protocol slot, in which a backoff time varies by allocating different backoff exponents (BEs) for determining a random backoff time, the method comprising:
   initializing, by a processor, a CW counter, as 2;
   determining, by the processor, if a channel is occupied;
   decreasing, by the processor, the CW counter by 1 when the channel is determined to be idle;
   re-determining, by the processor, if the channel is occupied; and
   determining if the CW counter is 1 when the channel is re-determined to be occupied; and
   wherein if the CW counter is 1, then the BE is set to a first value, and
   wherein if the CW counter is not 1, then the BE is set to a second value that is different than the first value.

2. The method as claimed in claim 1, further comprising setting BE as aMaxBE when the channel is re-determined to be occupied.

3. The method as claimed in claim 1, wherein the CW counter is initialized and BE is increased by 1 when the channel is re-determined to not be occupied.

4. A method of recognizing an available channel in order to prevent channel occupation requirements from colliding with each other when one wireless channel is shared by plural terminals in a CSMA/CA mechanism using an IEEE 802.15.4 protocol slot, in which a backoff time varies by allocating different backoff exponents (BEs) for determining a random backoff time, the method comprising:
   initializing, by a processor, counters, CW, and NB, as 2 and 0, respectively;
   waiting, by the processor, for a unit backoff period corresponding to a randomly selected integer;
   determining, by the processor, if a channel is occupied;
   decreasing, by the processor, the CW counter by 1 when the channel is determined to be idle;
   re-determining, by the processor, if the channel is occupied; and
   determining, by the processor, if the CW counter is 1 when the channel is re-determined to be occupied;
   wherein if the CW counter is 1, then the BE is set to a first value, and if the CW counter is not 1, then the BE is set to a second value that is different than the first value.

5. The method as claimed in claim 4, further comprising setting BE as aBESCB, a certain value greater than aMaxBE, when the CW counter is determined to be 1.

6. The method as claimed in claim 4, wherein when CW counter is determined not to be 1, the CW counter is initialized and BE is increased by 1.

* * * * *